United States Patent
Nishino et al.

(10) Patent No.: US 7,579,736 B2
(45) Date of Patent: Aug. 25, 2009

(54) THREE-PHASE DC BRUSHLESS MOTOR AND WINDING METHOD

(75) Inventors: Hideki Nishino, Takatsuki (JP); Kiyotaka Tanimoto, Nagaokakyo (JP); Taishii Iwanaga, Nagaokakyo (JP); Shinichi Kuroshima, Ibaraki (JP); Yoshiaki Igarashi, Ikoma (JP)

(73) Assignee: Panasonic Corporation, Osaka (JP)

( * ) Notice: Subject to any disclaimer, the term of this patent is extended or adjusted under 35 U.S.C. 154(b) by 589 days.

(21) Appl. No.: 11/385,334

(22) Filed: Mar. 21, 2006

(65) Prior Publication Data

US 2006/0214529 A1    Sep. 28, 2006

(30) Foreign Application Priority Data

Mar. 28, 2005    (JP)    ............................. 2005-092066

(51) Int. Cl.
*H02K 17/12* (2006.01)
(52) U.S. Cl. ....................................... 310/198; 310/184

(58) Field of Classification Search ................. 310/179, 310/184, 198
See application file for complete search history.

(56) References Cited

U.S. PATENT DOCUMENTS

| 4,549,106 | A | * | 10/1985 | Stroud | .................. 310/184 |
| 5,006,745 | A | * | 4/1991 | Nishio et al. | ............... 310/177 |
| 7,501,729 | B2 | * | 3/2009 | Takeuchi | .................. 310/71 |

FOREIGN PATENT DOCUMENTS

| JP | 4-134179 | 12/1992 |
| JP | 2000-324782 A | 11/2000 |

* cited by examiner

*Primary Examiner*—Dang D Le
(74) *Attorney, Agent, or Firm*—RatnerPrestia (57) ABSTRACT

A three-phase DC brushless motor and coil winding method provide a coil winding enabling consistent starting with PWM sensorless driving by suppressing the DC offset component of the induced voltage resulting from an imbalance in the motor coil windings. The method of winding the armature winding of the three-phase DC brushless motor renders the difference in mutual inductance substantially zero.

2 Claims, 8 Drawing Sheets

THREE-PHASE DC BRUSHLESS MOTOR AND WINDING METHOD

BACKGROUND OF THE INVENTION (1) Field of the Invention

The present invention relates generally to a winding method for a coil winding that can be used with the stator core of a three-phase DC brushless motor having a plurality of slots, and relates more particularly to a motor suitable for sensorless drive of pulse width modulation (PWM) operation.

(2) Description of Related Art

DC brushless motors use a sensorless drive method that does not require position detection elements in order to meet the strong demand for small, thin, low cost motors. Growing demand for low power consumption has also led to the use of PWM sensorless drive methods that achieve low power consumption by pulse width modulation of the motor drive current. Sensorless driving a DC brushless motor generally turns the motor by determining the appropriate commutation sequence by detecting the rotor position by detecting the point at which the back electromotive force of each phase generated proportionally to the motor speed, and the center tap voltage of the center tap where the three phase coils are connected in a star, are equal.

One method of detecting the specific rotor position supplies current to two phases, leaves the other phase non-energized, and detects the position of the output terminal by comparing the back electromotive force and the center tap voltage at the output terminal.

The motor terminal voltage varies greatly in PWM sensorless driving, however, as a result of PWM driving the motor output voltage. As a result, current flow to the motor coil has a time constant slope that is determined by the coil constant of the motor. A voltage known as the "induced voltage" occurs according to the time change in the current at the terminal of the non-energized phase. This is caused by the time change of the current and the mutual inductance representing the effect of each of the three phases on the other two phases. In conventional linear sensorless driving, the motor output voltage varies linearly, and linear current flows through the motor coils. The effect of mutual inductance is therefore zero.

Figure 7:
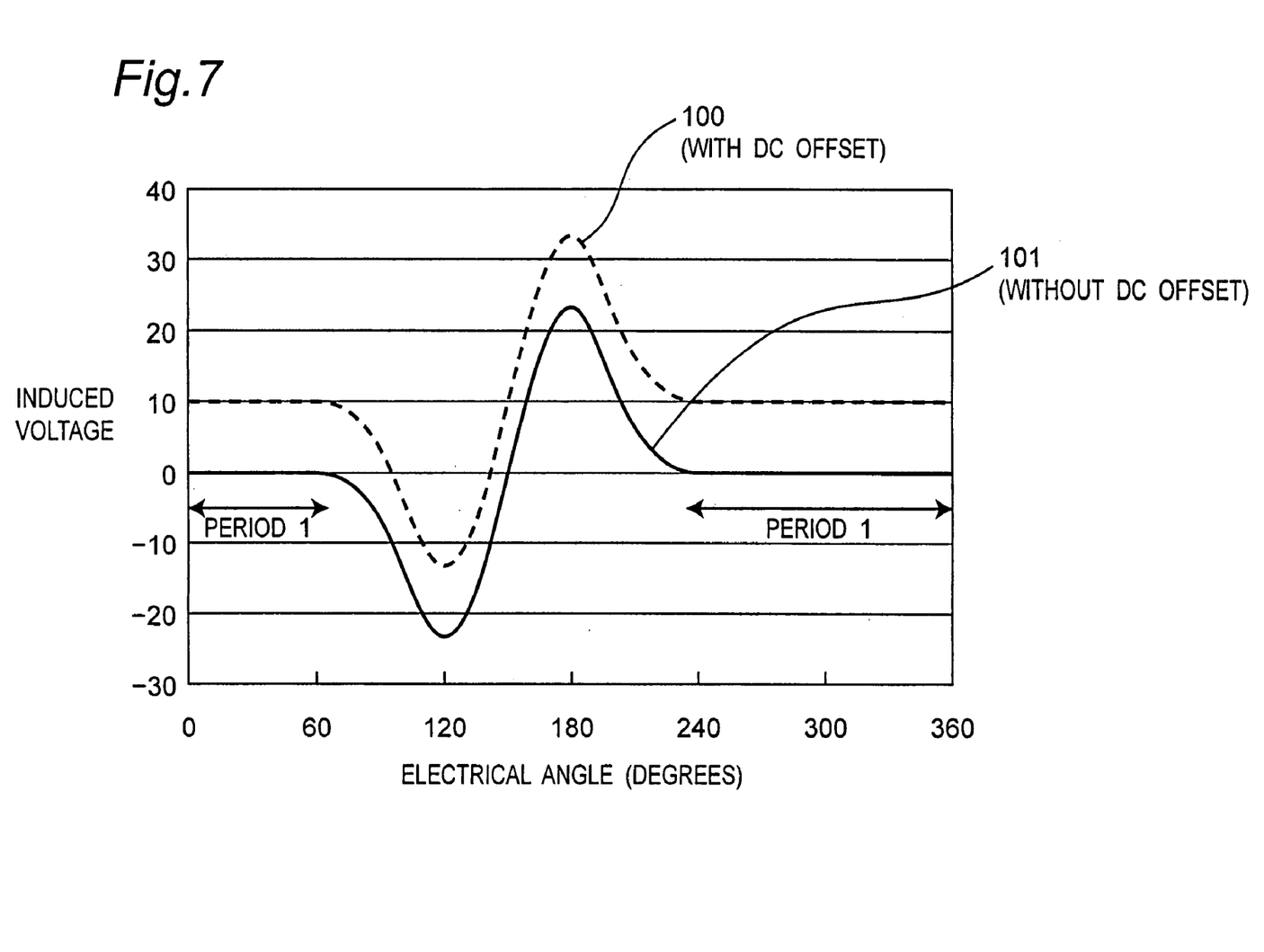
FIG. 7 shows the induced voltage waveform at the rotor position.
Figure 8:
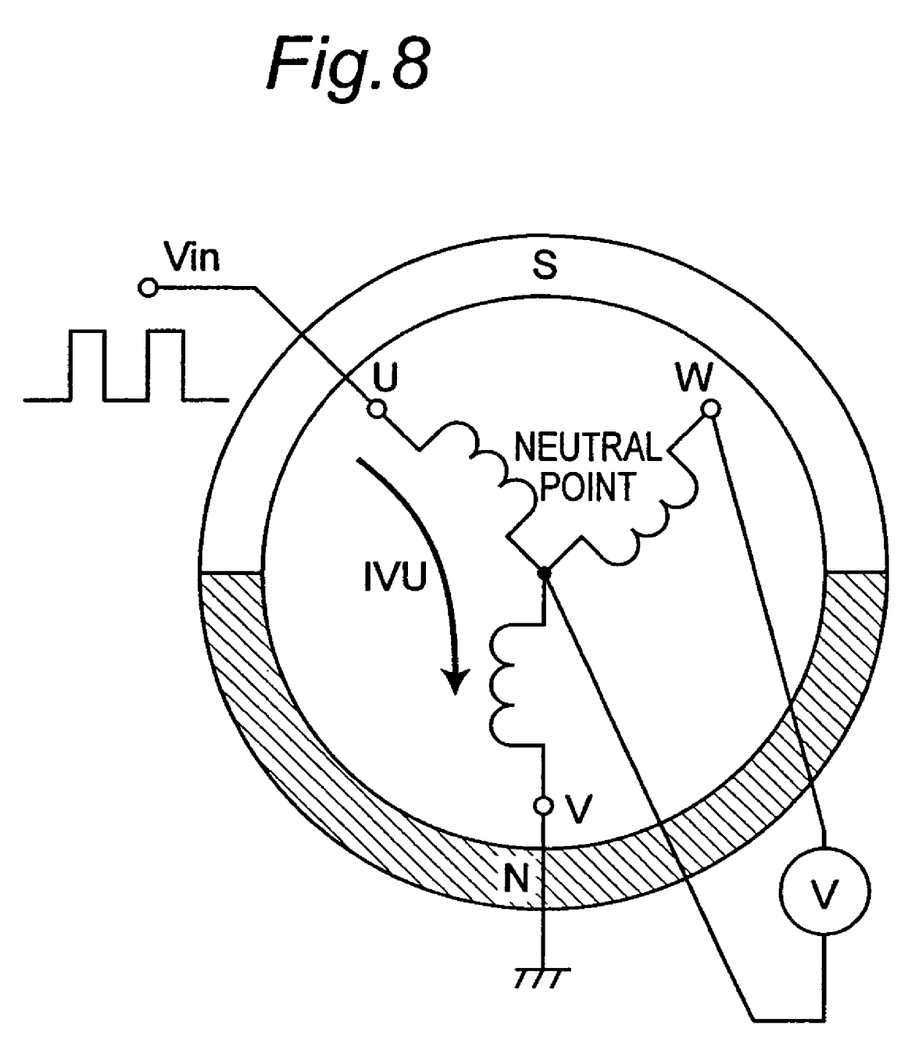
FIG. 8 describes measuring the induced voltage of the non-energized phase.

Curve 101 in FIG. 7 represents the relationship between the rotor position and the induced voltage produced at the non-energized phase when a pulse voltage is applied from the U phase to the V phase as shown in FIG. 8. As shown by curve 101 in FIG. 7, the magnitude of the induced voltage varies according to the rotor position. Although the position of the rotor was fixed to measure the curve 101 shown in FIG. 7, the rotor is normally turning and the total voltage of this induced voltage plus the back electromotive force produced by rotor rotation is produced in the non-energized phase. This total voltage and the center tap voltage are compared to detect rotor position and switch the motor coil current to drive the motor.

If there is an imbalance in the number of windings or the method of winding the motor coils, there will also be an imbalance in the mutual inductance of the phases, and the induced voltage will therefore have a dc offset voltage as indicated by curve 100 in FIG. 7. When this dc offset voltage occurs, the rotor position may be wrongly detected in periods 1 in FIG. 7, that is, where the rotor should not normally be detected.

This induced voltage does not occur with conventional linear sensorless driving, however, and the rotor position can therefore be accurately detected without considering the winding method of the motor coil winding.

With PWM sensorless driving, however, an imbalance in the number of windings or the method of winding the motor coils can cause the rotor to be detected where the rotor is not actually positioned, resulting in startup failures or delayed starting.

BRIEF SUMMARY OF THE INVENTION

To achieve these objects, a three-phase DC brushless motor according to a first aspect of the invention has 3N (where N is a positive integer) stators arranged in a star pattern; a rotor having 4N permanent magnets arranged with alternating north and south poles; a first-phase coil wound to every third stator; a second-phase coil wound to the next every third stator; and a third-phase coil wound to the yet next every third stator; wherein the difference in the mutual inductance of any two of the first-phase, second-phase, and third-phase coils is substantially zero.

A three-phase DC brushless motor according to another aspect of the invention has 3N (where N is a positive integer) stators arranged in a star pattern; a rotor having 4N permanent magnets arranged with alternating north and south poles; a first-phase coil wound to every third stator; a second-phase coil wound to the next every third stator; and a third-phase coil wound to the yet next every third stator; wherein the first-phase coil winds in the positive direction around the last first-phase stator and then exits from a predetermined position; the second-phase coil winds in the positive direction around the last second-phase stator and then exits from a predetermined position; and the third-phase coil winds in the positive direction around the last third-phase stator and then exits from a predetermined position.

A three-phase DC brushless motor according to third aspect of the invention has 3N (where N is a positive integer) stators arranged in a star pattern; a rotor having 4N permanent magnets arranged with alternating north and south poles; a first-phase coil wound to every third stator; a second-phase coil wound to the next every third stator; and a third-phase coil wound to the yet next every third stator; wherein the first-phase coil winds in the positive direction around the last first-phase stator, then winds one extra turn in the negative direction around the last third-phase stator, and then exits from a predetermined position between the last second-phase stator and the last third-phase stator; the second-phase coil winds in the positive direction around the last second-phase stator and then exits from a predetermined position; and the third-phase coil winds in the positive direction around the last third-phase stator, then winds one extra turn in the positive direction around the first first-phase stator, and then exits from a predetermined position.

A three-phase DC brushless motor according to fourth aspect of the invention has 3N (where N is a positive integer) stators arranged in a star pattern; a rotor having 4N permanent magnets arranged with alternating north and south poles; a first-phase coil wound to every third stator; a second-phase coil wound to the next every third stator; and a third-phase coil wound to the yet next every third stator; wherein the first-phase coil winds in the positive direction around the last first-phase stator, and then exits from a predetermined position between the last first-phase stator and the last second-phase stator; the second-phase coil winds in the positive direction around the last second-phase stator, then winds one extra turn in the positive direction around the last third-phase stator, and then exits from the predetermined position; and the third-phase coil winds in the positive direction around the last third-phase stator, then winds one-half turn in the negative direction around the last second-phase stator, and then exits from the predetermined position.

A fifth aspect of the invention is a coil winding method for a three-phase DC brushless motor having: 3N (where N is a positive integer) stators arranged in a star pattern; a rotor having 4N permanent magnets arranged with alternating north and south poles; a first-phase coil wound to every third stator; a second-phase coil wound to the next every third stator; and a third-phase coil wound to the yet next every third stator; wherein the first-phase coil winds in the positive direction around the last first-phase stator and then exits from a predetermined position; the second-phase coil winds in the positive direction around the last second-phase stator and then exits from a predetermined position; and the third-phase coil winds in the positive direction around the last third-phase stator and then exits from a predetermined position.

A sixth aspect of the invention is a coil winding method for a three-phase DC brushless motor having: 3N (where N is a positive integer) stators arranged in a star pattern; a rotor having 4N permanent magnets arranged with alternating north and south poles; a first-phase coil wound to every third stator; a second-phase coil wound to the next every third stator; and a third-phase coil wound to the yet next every third stator; wherein the first-phase coil winds in the positive direction around the last first-phase stator, then winds one extra turn in the negative direction around the last third-phase stator, and then exits from a predetermined position between the last second-phase stator and the last third-phase stator; the second-phase coil winds in the positive direction around the last second-phase stator and then exits from a predetermined position; and the third-phase coil winds in the positive direction around the last third-phase stator, then winds one extra turn in the positive direction around the first first-phase stator, and then exits from a predetermined position.

A seventh aspect of the invention is a coil winding method for a three-phase DC brushless motor having: 3N (where N is a positive integer) stators arranged in a star pattern; a rotor having 4N permanent magnets arranged with alternating north and south poles; a first-phase coil wound to every third stator; a second-phase coil wound to the next every third stator; and a third-phase coil wound to the yet next every third stator; wherein the first-phase coil winds in the positive direction around the last first-phase stator, and then exits from a predetermined position between the last first-phase stator and the last second-phase stator; the second-phase coil winds in the positive direction around the last second-phase stator, then winds one extra turn in the positive direction around the last third-phase stator, and then exits from the predetermined position; and the third-phase coil winds in the positive direction around the last third-phase stator, then winds one-half turn in the negative direction around the last second-phase stator, and then exits from the predetermined position.

The method of winding the coil of a three-phase DC brushless motor according to the present invention enables starting the motor stably without being affected by the dc offset voltage of the induced voltage even when using PWM sensorless driving.

Other objects and attainments together with a fuller understanding of the invention will become apparent and appreciated by referring to the following description and claims taken in conjunction with the accompanying drawings.

DETAILED DESCRIPTION OF THE INVENTION

Embodiment 1

A first preferred embodiment of the present invention is described below with reference to the accompanying figures.

Figure 1:
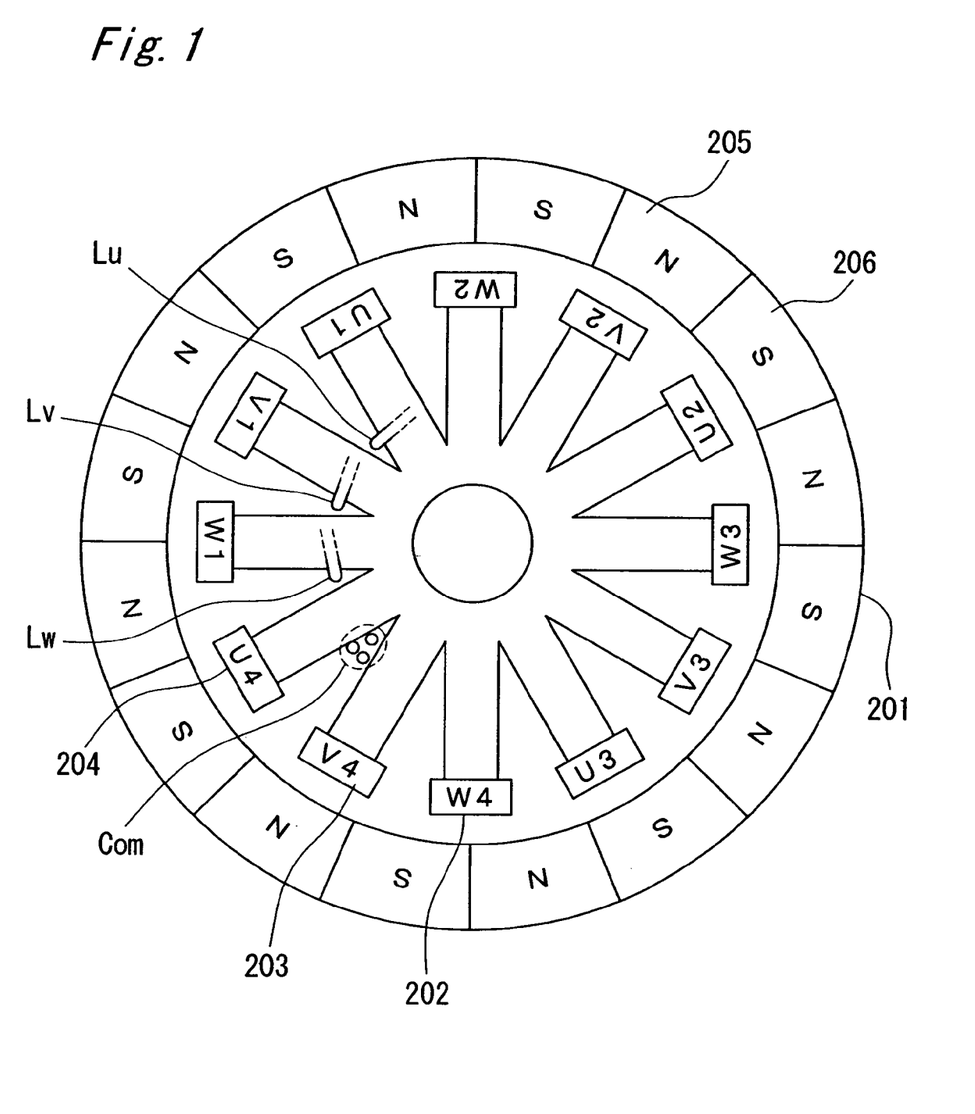
FIG. 1 shows the arrangement of a DC brushless motor.

FIG. 1 shows the arrangement of a three-phase DC brushless motor having a W phase stator 202, V phase stator 203, U phase stator 204, and rotor 201. The phases of the W phase stator 202, V phase stator 203, and U phase stator 204 are divided into four parts offset 90 degrees so that there are 12 stators labelled W1, V1, U1, W2, V2, U2, W3, V3, U3, W4, V4, U4 clockwise. The rotor 201 consists of a total 16 permanent magnets including eight N-pole permanent magnets 205 alternating with eight S-pole permanent magnets 206. In this aspect of the invention there are 12 stator poles and 16 rotor poles, and the stator to permanent magnet pole ratio is thus 3:4. The number of stator poles and the number of permanent magnet poles can vary insofar as the stator to permanent magnet pole ratio is 3:4.

A three-phase DC brushless motor according to the present invention thus comprises 3N (where N is a positive integer) stators 202, 203, 204 radiating from a common center point, a rotor 201 having 4N permanent magnets 205, 206 with alternating north and south poles, a first phase (W phase) winding LW wound to every third stator, a second phase (V phase) winding LV wound to the next every third stator, and a third phase (U phase) winding LU wound to the next every third stator.

One coil winding LW is wound to W phase stators W1, W2, W3, W4. This coil winding LW starts from between stator W1 and stator U4, passes over the first surface of stator W1 (that is, the surface that is visible in FIG. 1) and between stator W1 and stator V1, then around the second surface of stator W1 (that is, the surface that is hidden in FIG. 1 and is in contact with the motor circuit board) and between stator W1 and stator U4, thus forming one turn in the positive direction (also called the counterclockwise direction) around stator W1. The starting end of coil winding LW is thus between stator W1 and stator U4, and is wound from there around the second surface of the stator W1. The coil winding LW is thus wound a predetermined number of times around stator W1, then a predetermined number of times around stator W2, then a predetermined number of times around stator W3, and finally a predetermined number of times around stator W4. The terminating end of the coil winding LW thus exits between stator V4 and stator U4 from a predetermined position Com on the second surface of stator V4.

Note that the stator that is wound first, that is, stator W1 in this example, is referred to below as the "starting stator," and the stator that is wound last, stator W4 in this example, is the "ending stator."

One coil winding LV is wound to V phase stators V1, V2, V3, V4. This coil winding LV starts from between stator V1 and stator W1, passes over the first surface of stator V1 (that is, the surface that is visible in FIG. 1) and between stator V1 and stator U1, then around the second surface of stator U1 (that is, the surface that is hidden in FIG. 1 and is in contact with the motor circuit board) and between stator V1 and stator W1, thus forming one turn in the positive direction (also called the counterclockwise direction) around stator V1. The starting end of coil winding LV is thus between stator V1 and stator W1, and is wound from there around the second surface of the stator V1. The coil winding LV is thus wound a predetermined number of times around stator V1, then a predetermined number of times around stator V2, then a predetermined number of times around stator V3, and finally a predetermined number of times around stator V4. The terminating end of the coil winding LV thus exits between stator V4 and stator U4 from a predetermined position Com on the second surface of stator V4.

One coil winding LU is wound to U phase stators U1, U2, U3, U4. This coil winding LU starts from between stator U1 and stator V1, passes over the first surface of stator U1 (that is, the surface that is visible in FIG. 1) and between stator U1 and stator W2, then around the second surface of stator U1 (that is, the surface that is hidden in FIG. 1 and is in contact with the motor circuit board) and between stator U1 and stator V1, thus forming one turn in the positive direction (also called the counterclockwise direction) around stator U1. The starting end of coil winding LU is thus between stator U1 and stator V1, and is wound from there around the second surface of the stator U1. The coil winding LU is thus wound a predetermined number of times around stator U1, then a predetermined number of times around stator U2, then a predetermined number of times around stator U3, and finally a predetermined number of times around stator U4. The terminating end of the coil winding LU thus exits between stator V4 and stator U4 from a predetermined position Com on the second surface of stator V4.

Figure 2:
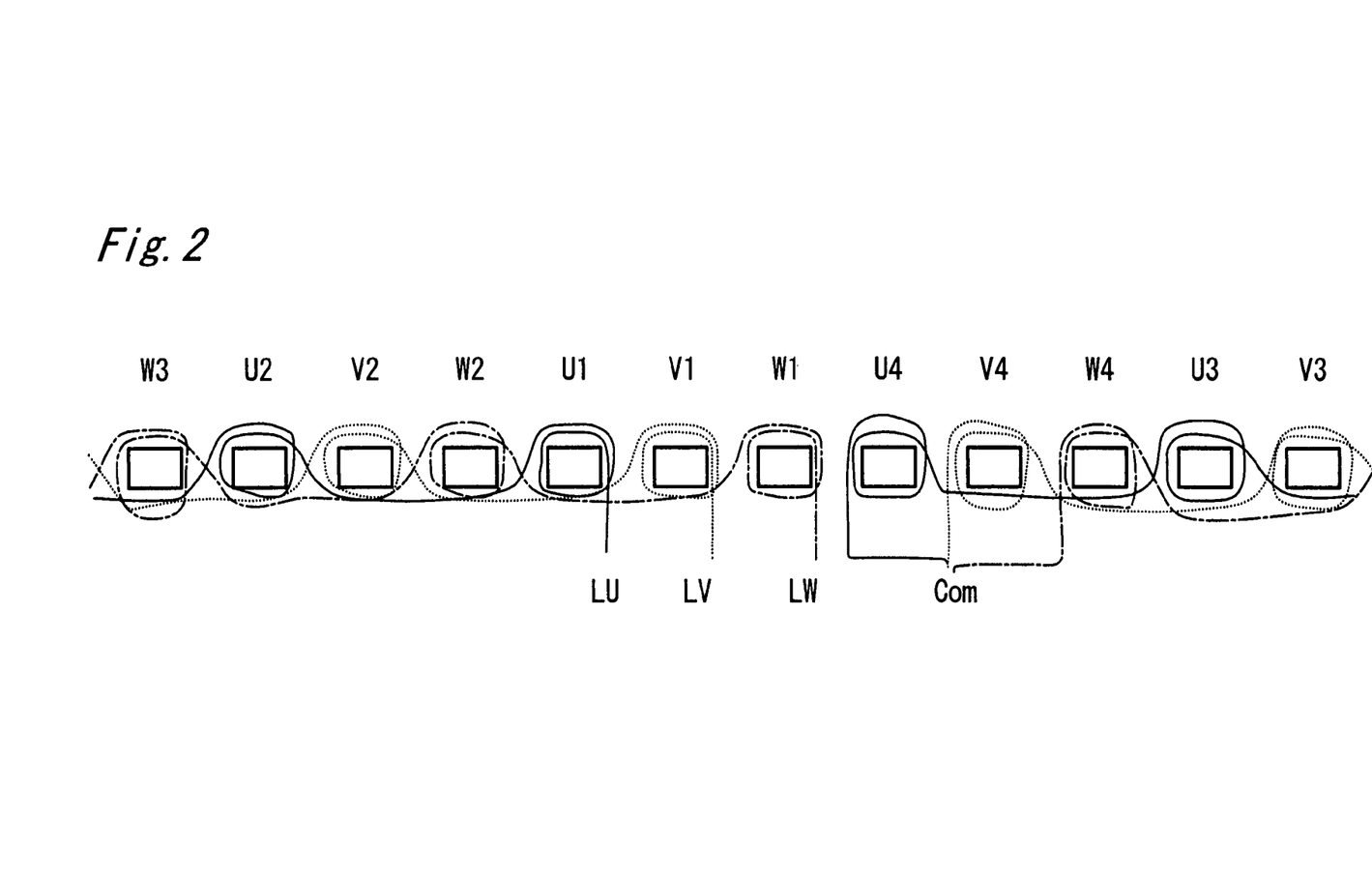
FIG. 2 shows the motor coil winding in a first embodiment of the invention.

FIG. 2 shows how the coils are wound in a three-phase DC brushless motor according to this first embodiment of the invention. Note that the W phase stator 202, V phase stator 203, and U phase stator 204 shown in FIG. 1 are shown in a line in FIG. 2 for illustration. The end of each stator shown in FIG. 2 is the end facing the rotor, the opposite end (which would pass through to the other side of the page) is at the center of the stator, the top of each stator is the first surface referred to above, and the bottom of each stator is the second surface.

The U phase coil winding LU is wound a predetermined number of turns counterclockwise from the starting point at the bottom right side of stator U1, then passes below the bottom (second surface) of stator W2 and stator V2, and is passed to stator U2. The coil is also wound a predetermined number of turns counterclockwise around stator U2 starting from the bottom right side in the same way as stator U1. Stator U3 and stator U4 are wound in the same way, and the V phase and W phase are also wound exactly the same way. The end of each winding is pulled out from the bottom left side of stator U4, stator V4, and stator W4, the ends are bundled at position Com between stator U4 and stator V4, and the bundle is connected to a common node outside the stator. The windings are connected to a common node outside the stator in order to eliminate the effect of mutual inductance on the other phases.

The first phase winding in this first embodiment of the invention is thus wound in the positive direction around the last first phase stator and is then pulled out from a predetermined position, the second phase winding is wound in the positive direction around the last second phase stator and is then pulled out from a predetermined position, and the third phase winding is wound in the positive direction around the last third phase stator and is then pulled out from a predetermined position.

The effect of mutual inductance in this embodiment of the invention is next described mathematically.

Figure 5:
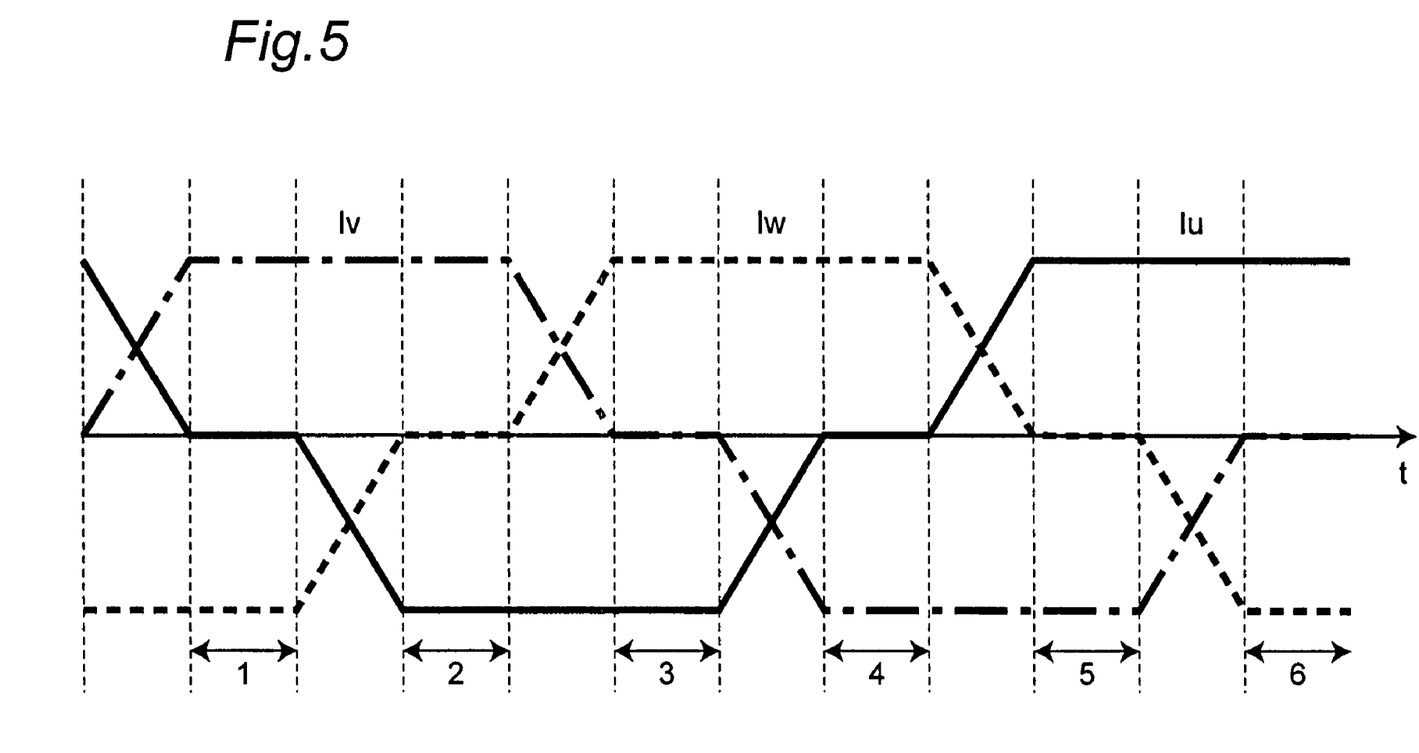
FIG. 5 is a waveform diagram of the motor coil current during sensorless driving.

FIG. 5 is a waveform diagram showing the commutation current applied to a three-phase DC brushless motor. If Eu-dn, Ew-up, Ev-dn, Eu-up, Ew-dn, and Ev-up denote the DC offset component of the induced voltage caused by PWM driving in the non-energized phases 1, 2, 3, 4, 5, and 6, respectively, then Eu-dn can be expressed by equation (1).

$$Eu\text{-}dn = Mvu*(dIv/dt) + Mwu*(dIw/dt) \quad (1)$$

where Mvu is the mutual inductance from the V phase to the U phase, and Mwu is the mutual inductance from the W phase to the U phase.

Two aspects of the arrangement shown in FIG. 2 are considered next.

The first aspect is the method of passing the coil from one stator of a particular phase to another stator of the same phase (referred to below as bridging). The second aspect is the difference in the number of turns in the winding of each phase. These two aspects can be used to rewrite equation 1 above as follows.

$$Eu\text{-}dn = Eu\text{-}dn(\text{bridge}) + Eu\text{-}dn \quad (\text{number of turns})$$

The method of bridging the coils is described first.

If as shown in FIG. 5 Iw=−Iv and dIv/dt=−1, then equation (1) can be written:

$$Eu\text{-}dn(\text{bridge}) = -Mvu + Mwu$$

and $$Ev\text{-}dn(\text{bridge}) = -Mwv + Muv$$

$$Ew\text{-}dn(\text{bridge}) = -Muw + Mvw$$

While only Eu-dn, Ev-dn, and Ew-dn are shown here, Eu-up, Ev-up, and Ew-up are identical.

Furthermore, because Mvu and Muv are equal, the above equations can be rewritten using Muv, Mvw, and Mwu as follow.

$$Eu\text{-}dn(\text{bridge}) = -Muv + Mwu$$

$$Ev\text{-}dn(\text{bridge}) = -Mvw + Muv$$

$$Ew\text{-}dn(\text{bridge}) = -Mwu + Mvw$$

The mutual inductance between the bridge of the coil of one phase and the stators of the other phases is considered next where n is the number of turns of the coil around each stator.

In the arrangement shown in FIG. 2, Muv is affected by the mutual inductance between U1, V2, U2, V3, U3, and V4, $$Muv = [n*(-\tfrac{1}{2})] + [-\tfrac{1}{2}*n] + [n*(-\tfrac{1}{2})] + [-\tfrac{1}{2}*n] + [n*(-\tfrac{1}{2})] + [-\tfrac{1}{2}*n] = -3*n$$

$$Mvw = -3*n$$

and $$Mwu = -3*n.$$

As a result, $$Eu\text{-}dn(\text{bridge}) = Ev\text{-}dn(\text{bridge}) = Ew\text{-}dn(\text{bridge}) = 0$$

The difference in the number of winding turns in each of the phases is described next.

If the number of turns in the winding on each stator element of a certain phase is the same as the number of winding turns on the stator elements of the other phases, and the mutual inductance is an equal M, the induced voltage produced from one segmented phase on an adjacent other phase will have the opposite polarity and half the amplitude. As a result, equation (1) above becomes:

$$Eu\text{-}dn(\text{number of turns}) = -\frac{1}{2}[M^*(dlv/dt) + M^*(dlw/dt)]$$

and $$Ev\text{-}dn(\text{number of turns}) = -\frac{1}{2} * [M^*(dlw/dt) + M^*(dlu/dt)]$$

$$Ew\text{-}dn(\text{number of turns}) = -\frac{1}{2} * [M^*(dlu/dt) + M^*(dlv/dt)]$$

Note that while only Eu-dn, Ev-dn, Ew-dn are shown above, Eu-up, Ev-up, and Ew-up are identical.

If the number of turns of the coil winding on each stator is n, there is no difference in the number of turns in the arrangement shown in FIG. 2. As a result, $$Eu\text{-}dn \text{ (number of turns)} = Ev\text{-}dn \text{ (number of turns)}$$
$$= Ew\text{-}dn \text{ (number of turns)}$$
$$= 0$$
$$Eu\text{-}dn = Eu\text{-}dn \text{ (bridge)} + Eu\text{-}dn \text{ (number of turns)}$$
$$= 0$$

and $$Ev\text{-}dn = Ew\text{-}dn = 0.$$

Likewise, $$Eu\text{-}up = Ev\text{-}up = Ew\text{-}up = 0.$$

As a result, no DC offset component of the induced voltage occurs, and consistent starting can be assured with PWM sensorless driving.

Embodiment 2

Figure 3:
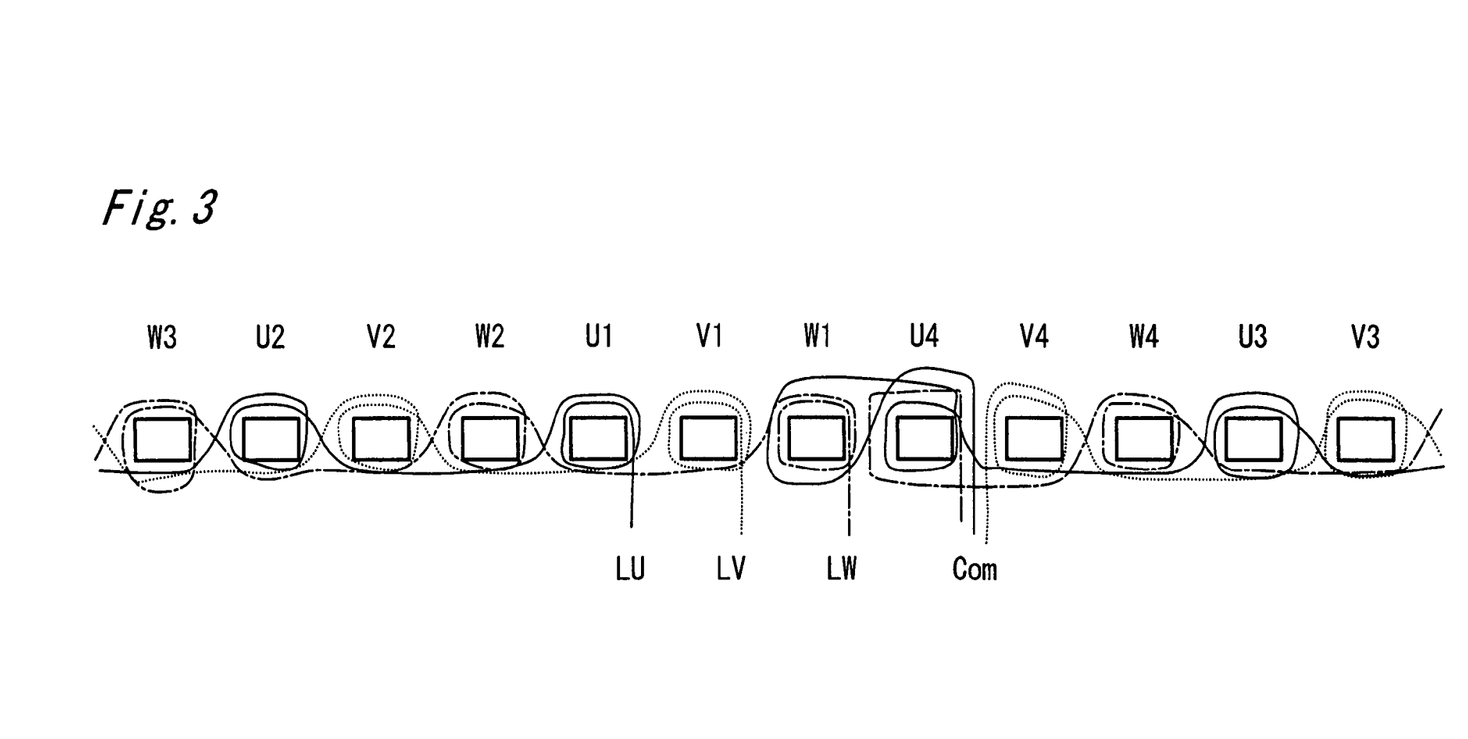
FIG. 3 shows the motor coil winding in a second embodiment of the invention.

A second embodiment of the present invention is described next. FIG. 3 describes winding the coils of a three-phase DC brushless motor according to this second embodiment of the invention. Similarly to FIG. 2 showing the first embodiment of the invention, FIG. 3 shows the W phase stator 202, V phase stator 203, and U phase stator 204 shown in FIG. 1 arrayed in sequence in a line.

This embodiment differs from the first embodiment in the method of winding the end portions of coil windings LU, LV, LW. The common winding ends exit from the position Com between stator U4 and stator V4 as in the first embodiment, but the ends of coil windings LU, LV and LW are all wound from the first surface to the second surface and exit from between stator U4 and stator V4.

The neutral ends are removed from between the same two stators as a means of pulling the neutral without allowing any slack in the motor coil. This results in an extra positive turn in the end of the winding after the last stator is wound, but the effect of mutual inductance can be cancelled by also adding a turn in the negative direction (also called the clockwise direction).

The winding method of the second embodiment shown in FIG. 3 is further described below, but because each coil winding is wound in the same way as in the first embodiment from the beginning of the coil winding to the end of winding the last stator, further description thereof is omitted below.

The end of the V phase coil winding LV winds from the first surface to the second surface at the neutral position Com, and is therefore wound exactly the same way as in the first embodiment.

After winding around the last U phase stator U4 a predetermined number of times, the U phase coil winding LU winds one extra turn in the counterclockwise (positive) direction around the adjacent stator W1, which is the first W phase stator, and then passes over the top (first surface) of stator U4 before exiting from the neutral end point at position Com.

The W phase coil winding LW winds a predetermined number of times around the last W phase stator W4, then passes over the second surface of stator V4, winds one extra turn in the clockwise (negative) direction around the last U phase stator U4, and then exits from the neutral end point at position Com.

This winding method reduces the induced voltage offset because the mutual inductance of the extra positive turn of the U phase coil winding LU and the extra negative turn of the W phase coil winding LW cancel each other out.

As will be understood from the above description, the first phase winding is wound in the positive direction around the last first-phase stator, is then wound one extra turn in the negative direction around the last third-phase stator, and then exits from a predetermined position between the last second-phase stator and the last third-phase stator; the second phase winding is wound in the positive direction around the last second-phase stator and then exits directly from the predetermined position; and the third phase winding is wound in the positive direction around the last third-phase stator, then one extra turn in the positive direction around the first first-phase stator, and then exits from the predetermined position.

The effect of mutual inductance with the arrangement of this embodiment of the invention is mathematically described below.

As in the first embodiment, in FIG. 3 Muv is affected by the mutual inductance between U1, V2, U2, V3, U3, and V4.

$$Muv = [n*(-1/2)] + [-1/2*n] + [n*(-1/2)] +$$
$$[-1/2*n] + [n*(-1/2)] + [-1/2*n]$$
$$= -3*n$$

Mvw is affected by the mutual inductance between V1, W2, V2, W3, V3, W4, V4.

$$Mvw = [n*(-1/2)] + [-1/2*n] + [n*(-1/2)] + [-1/2*n] +$$
$$[n*(-1/2)] + [-1/2*n] + [n*(-1/2)]$$
$$= -3.5*n$$

Mwu is affected by the mutual inductance between U1, W2, U2, W3, U3, W4, U4, W1.

$$Mwu = [-1/2*n] + [n*(-1/2)] + [-1/2*n] + [n*(-1/2)] +$$
$$[-1/2*n] + [n*(-1/2)] + [n*(-1)] + [1*n]$$
$$= -3*n$$

As a result:

$Eu\text{-}dn(\text{bridge})=0$ $Ev\text{-}dn(\text{bridge})=0.5*n$ $Ew\text{-}dn(\text{bridge})=-0.5*n$ The difference between the three phases in the number of turns is the same as in the first embodiment. That is:

$Eu\text{-}dn(\text{number of turns})=-\frac{1}{2}*[M*(dlv/dt)+M*(dlw/dt)]$ $Ev\text{-}dn(\text{number of turns})=-\frac{1}{2}*[M*(dlw/dt)+M*(dlu/dt)]$ $Ew\text{-}dn(\text{number of turns})=-\frac{1}{2}*[M*(dlu/dt)+M*(dlv/dt)]$ Note that while only Eu-dn, Ev-dn, Ew-dn are shown above, Eu-up, Ev-up, and Ew-up are identical.

If the number of turns of the coil winding on each stator is n, there is a difference in the number of turns with the arrangement shown in FIG. 3 at W1 and U4. The U phase coil is wound one turn to W1, and the U phase coil is wound 0.5 turn and the W phase coil is wound one turn in reverse to U4.

Furthermore, if as shown in FIG. 5

$dlv/dt=-(dlw/dt)=1$ $dlw/dt=-(dlu/dt)=1$, and $dlu/dt=-(dlv/dt)=1$, then $Eu\text{-}dn(\text{number of turns})=-\frac{1}{2}[*\{n*(1-0.5)*(-1)\}+\{n*(-0.5)*(1)\}]=0.5*n$ $Ev\text{-}dn(\text{number of turns})=-\frac{1}{2}[*\{n*(-1)*(-1)\}+\{n*(1-0.5)*(1)\}]=-0.75*n$ and $Ew\text{-}dn(\text{number of turns})=-\frac{1}{2}[\{n*(-0.5)*(-1)\}+\{n*(-1)*(1)\}]=0.25*n.$ As a result, $Eu\text{-}dn=0.5*n$ $Ev\text{-}dn=-0.25*n$, and $Ew\text{-}dn=-0.25*n.$ This embodiment of the invention thus reduces the DC offset component of the induced voltage, and thereby enables consistent starting with PWM sensorless driving.

Third Embodiment

Figure 4:
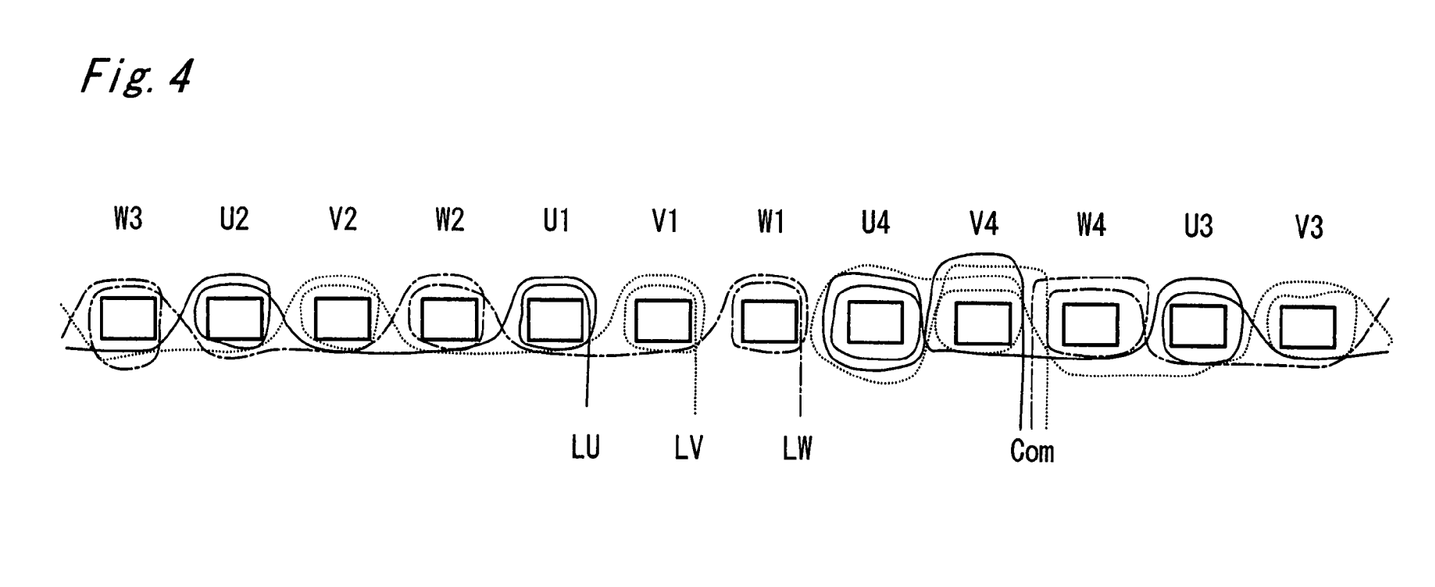
FIG. 4 shows the motor coil winding in a third embodiment of the invention.

FIG. 4 shows a third embodiment of the invention. The third embodiment shown in FIG. 4 differs from the second embodiment of the invention shown in FIG. 3 in that the neutral end point is at position Com between stator V4 and stator W4.

The winding method of the third embodiment shown in FIG. 4 is further described below, but because each coil winding is wound in the same way as in the first embodiment from the beginning of the coil winding to the end of winding the last stator, further description thereof is omitted below.

The W phase coil winding LW is wound a predetermined number of times around the last stator W4, and the end is then wound again around the first surface before exiting from the neutral position Com between stator W4 and stator V4.

The U phase coil winding LU is wound a predetermined number of times around the last stator U4, then passes over the top (first surface) of the last V phase stator V4, and exits from the neutral position Com. As a result, the U phase coil winding LU winds an extra 0.5 turn in the clockwise (negative) direction around the last V phase stator V4.

The V phase coil winding LV is wound a predetermined number of times around the last stator V4, then winds an extra turn in the counterclockwise (positive) direction around the last U phase stator U4, then passes over the top (first surface) of the last V phase stator V4, and exits from the neutral position Com.

This winding method reduces the induced voltage offset because the mutual inductance of the U phase and V phase is cancelled by the extra half-turn of the winding.

As will be understood from the above description, the first-phase winding is wound in the positive direction around the last first-phase stator, and then exits from a predetermined position between the last first-phase stator and the last second-phase stator; the second phase winding is wound in the positive direction around the last second-phase stator, then one extra turn in the positive direction around the last third-phase stator, and then exits from the predetermined position; and the third phase winding is wound in the positive direction around the last third-phase stator, then one-half turn in the negative direction around the last second-phase stator, and then exits from the predetermined position.

While a second embodiment of the invention is described in FIG. 3 and a third embodiment of the invention is described in FIG. 4, it will be obvious that stable sensorless PWM driving can be achieved by any coil winding that satisfies the equations described above.

Motor Drive Apparatus

A motor drive apparatus used in the present invention is described next with reference to the figures.

Figure 6:
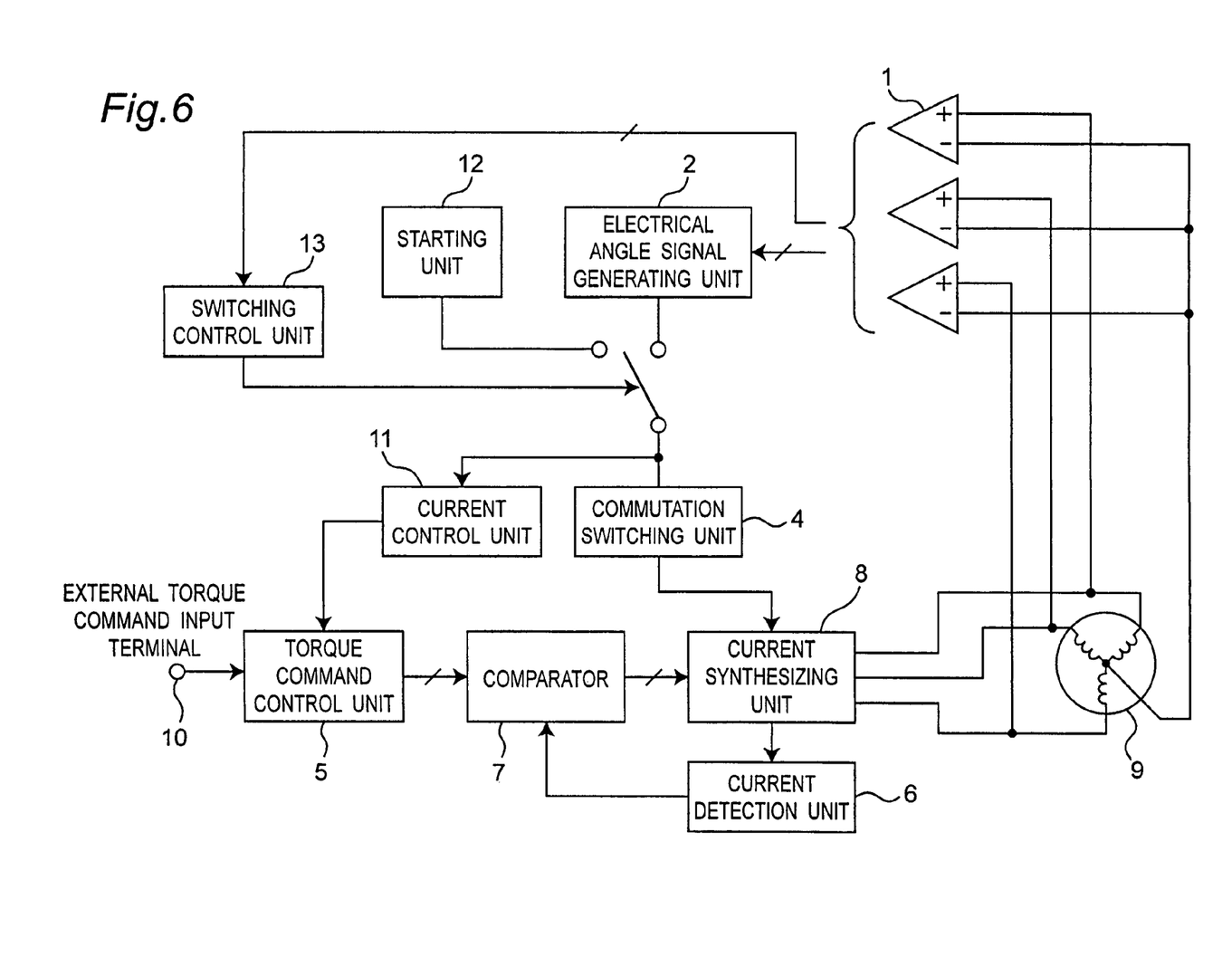
FIG. 6 is a schematic diagram of a PWM sensorless motor drive apparatus.

FIG. 6 is a schematic diagram showing a motor drive apparatus that operates using the first or second embodiment of the invention as described above. FIG. 5 is a waveform diagram of the motor coil current using this motor drive apparatus.

As shown in FIG. 6, this motor drive apparatus comprises a rotor position detection unit 1, an electrical angle signal generating unit 2, a commutation switching unit 4, a torque command control unit 5, a current detection unit 6, a comparator 7, a current synthesizing unit 8, a three-phase DC brushless motor 9 as described in the first and second embodiments above, an external torque command input terminal 10, a current control unit 11, a starting unit 12, and a switching control unit 13.

Sensorless driving is a control method that drives a motor by detecting the back electromotive force produced by rotor rotation. This means that the rotor position cannot be detected when the rotor is stopped because no back electromotive force is generated. During startup, therefore, the rotor is initially turned by the starting unit 12 unconditionally applying a commutation signal that switches the current at a known predetermined frequency. This commutation signal causes the rotor to turn and thus enables detecting the rotor position. Startup failures can occur, however, if a DC offset occurs in the induced voltage caused by PWM driving because the rotor position will not be correctly detected. The motor described in the first and second embodiments above is used to suppress induced voltage offset and thereby enable consistent detection of the rotor position at startup.

The three-phase back electromotive force produced by rotor rotation is input to rotor position detection unit 1. The back electromotive force is detected at this time in the non-energized phase periods 1 to 6 shown in FIG. 5. The signal from the rotor position detection unit 1 is output to the electrical angle signal generating unit 2 and switching control unit 13. The switching control unit 13 counts the number of rotor revolutions from the output signal of the rotor position detection unit 1, and when a specific count is reached switches the signal from the starting unit 12 to the electrical angle signal generating unit 2. Based on the signal from the rotor position detection unit 1, the electrical angle signal generating unit 2 generates a signal every 60 electrical degrees. This signal of 60 electrical degrees is input to the current control unit 11 and commutation switching unit 4.

The 60-degree electrical angle signal input to the commutation switching unit 4 is described next.

The 60-degree electrical angle signal input to the commutation switching unit 4 is a current switching signal for switching the current supply every 60 electrical degrees. Because one full period of the motor drive current is 360 electrical degrees, the 60-degree electrical angle signal applied in six periods constitutes one motor drive current period.

The motor drive current in each of these 60 electrical degree periods has two states, a rising current and a falling current. These two motor drive currents flow in two directions: into the motor and out from the motor. These four states are switched every 60 electrical degrees to generate the motor drive current in one 360 electrical degree period.

The 60-degree electrical angle signal input to the current control unit 11 is described next.

The 60-degree electrical angle signal input to the current control unit 11 and the external torque command signal 10 are input to the torque command control unit 5 and merged to generate a target value signal.

This target value signal and the drive current flowing to the motor that is detected by the current detection unit 6 are input to the comparator 7, which outputs a commutation signal that stops the current supply if the coil current reaches the target value. PWM control then starts current supply at a predetermined period, stops current supply if the motor drive current reaches the target value, and this control cycle repeats.

The commutation signal and current switching signal are input to the current synthesizing unit 8. The current synthesizing unit 8 controls state switching every 60 electrical degrees so that the specific motor drive current in each phase goes to the specified motor coil current.

The arrangement and control method described above generate a trapezoidal target value signal and control the motor drive current to a desired trapezoidal wave shape by means of PWM control.

Stable starting can be assured by using a drive apparatus as described above together with a motor having coils as described in the first embodiment, second embodiment, or third embodiment.

Application in Industry

The present invention thus provides a three-phase DC brushless motor that is ideally suited to sensorless PWM driving.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

The invention claimed is:

1. A three-phase DC brushless motor comprising:
3N (where N is a positive integer) stators arranged in a star pattern;
a rotor having 4N permanent magnets arranged with alternating north and south poles;
a first-phase coil wound to every third stator;
a second-phase coil wound to the next every third stator; and
a third-phase coil wound to the yet next every third stator;
wherein the first-phase coil winds in the positive direction around the last first-phase stator, then winds one extra turn in the negative direction around the last third-phase stator, and then exits from a predetermined position between the last second-phase stator and the last third-phase stator;
the second-phase coil winds in the positive direction around the last second-phase stator and then exits from a predetermined position; and
the third-phase coil winds in the positive direction around the last third-phase stator, then winds one extra turn in the positive direction around the first first-phase stator, and then exits from a predetermined position.

2. A coil winding method for a three-phase DC brushless motor comprising: 3N (where N is a positive integer) stators arranged in a star pattern; a rotor having 4N permanent magnets arranged with alternating north and south poles; a first-phase coil wound to every third stator; a second-phase coil wound to the next every third stator; and a third-phase coil wound to the yet next every third stator; wherein the first-phase coil winds in the positive direction around the last first-phase stator, then winds one extra turn in the negative direction around the last third-phase stator, and then exits from a predetermined position between the last second-phase stator and the last third-phase stator; the second-phase coil winds in the positive direction around the last second-phase stator and then exits from a predetermined position; and the third-phase coil winds in the positive direction around the last third-phase stator, then winds one extra turn in the positive direction around the first first-phase stator, and then exits from a predetermined position.

* * * * *

UNITED STATES PATENT AND TRADEMARK OFFICE
CERTIFICATE OF CORRECTION

PATENT NO. : 7,579,736 B2
APPLICATION NO. : 11/385334
DATED : August 25, 2009
INVENTOR(S) : Nishino et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 746 days.

Signed and Sealed this

Fourteenth Day of September, 2010

David J. Kappos
*Director of the United States Patent and Trademark Office*